(12) United States Patent
Sun et al.

(10) Patent No.: US 11,835,735 B2
(45) Date of Patent: Dec. 5, 2023

(54) COUPLING METHOD OF OPTICAL MODULE

(71) Applicant: JESS-LINK PRODUCTS CO., LTD., New Taipei (TW)

(72) Inventors: Chi-Hsien Sun, New Taipei (TW); Ching-Hung Liu, New Taipei (TW)

(73) Assignee: JESS-LINK PRODUCTS CO., LTD., New Taipei (TW)

( * ) Notice: Subject to any disclaimer, the term of this patent is extended or adjusted under 35 U.S.C. 154(b) by 437 days.

(21) Appl. No.: 17/165,312

(22) Filed: Feb. 2, 2021

(65) Prior Publication Data

US 2022/0146849 A1 May 12, 2022

(30) Foreign Application Priority Data

Nov. 12, 2020 (TW) .................................. 109139422

(51) Int. Cl.
*G02B 27/62* (2006.01)
*G01M 11/02* (2006.01)

(52) U.S. Cl.
CPC ......... *G02B 27/62* (2013.01); *G01M 11/0221* (2013.01)

(58) Field of Classification Search
CPC . G01M 11/0221; G02B 27/62; G02B 6/4219; G02B 6/422; G02B 6/4221; G02B 6/4225; G02B 6/4227
See application file for complete search history.

(56) References Cited

U.S. PATENT DOCUMENTS

| | | | |
|---|---|---|---|
| 6,888,652 B2 * | 5/2005 | Miyake ................ | G02B 6/4225 359/223.1 |
| 2005/0111794 A1 * | 5/2005 | Wang ................... | G02B 6/4214 385/52 |

(Continued)

FOREIGN PATENT DOCUMENTS

| | | | |
|---|---|---|---|
| CN | 1251478 C | 4/2006 | |
| TW | 201827874 A | 8/2018 | |
| WO | WO-2016140220 A1 * | 9/2016 | ......... G02B 27/1006 |

OTHER PUBLICATIONS

Office Action dated Mar. 4, 2021 of the corresponding Taiwan patent application No. 109139422.

*Primary Examiner* — Thomas A Hollweg
*Assistant Examiner* — Mary A El-Shammaa
(74) *Attorney, Agent, or Firm* — Chun-Ming Shih; HDLS IPR SERVICES

(57) ABSTRACT

A coupling method of an optical module is provided. A circuit board with a light emitting element emitting an output light and an output lens are provided. The light emitting element is covered by the output lens. The output lens is connected to an output meter. The output lens and the circuit board are moved relatively. An intensity of the output light is measured by the output meter. An output qualified region is defined based on a region where the output lens is located when the intensity of the output light is greater than an output requirement. The aforementioned steps are repeated for a predetermined number of times. The output lens and the circuit board are moved relatively in an intersection area of the output qualified regions. The output lens is fixed on the circuit board when the intensity of the output light is greater than the output requirement.

11 Claims, 3 Drawing Sheets

(56) References Cited

U.S. PATENT DOCUMENTS

| | | | |
|---|---|---|---|
| 2014/0250682 A1* | 9/2014 | Lai | H01L 21/67121 |
| | | | 29/705 |
| 2014/0251543 A1* | 9/2014 | Lai | G02B 7/02 |
| | | | 156/350 |
| 2022/0299718 A1* | 9/2022 | De Boer | G02B 6/4222 |

* cited by examiner

COUPLING METHOD OF OPTICAL MODULE

BACKGROUND OF THE INVENTION

Technical Field

This disclosure is related to a coupling method of an optical module and in particular related to a rapid batch coupling method of a multi-channel optical module.

Related Art

A related optical module has a circuit board, an input lens and an output lens. An optical receiver and an optical transmitter are arranged on the circuit board. The input lens is disposed corresponding to the optical receiver, and the input lens is connected to an optical signal source to transfer the optical signal to the optical receiver. An input optical signal received through the optical receiver is converted into an electric signal and amplified by the circuit board. The electric signal is further output as an output optical signal from the optical transmitter. The output lens is arranged corresponding to the optical transmitter for outputting the output optical signal.

When the input lens or the output lens is installed onto the circuit board, the input lens and the output lens should be coupled for aligning to the optical receiver and the optical transmitter respectively. Each of the optical signals in the lenses may thus meet a required intensity.

According to a coupling method of a related single signal channel optical module, the lens is firstly moved, and the moving direction is further adjusted toward a direction that the intensity is increased according to the intensity change of the optical signal transferred therein. The coupling process is accomplished when the intensity of the signal reaches a maximum value or is greater than a required value. However, when a lens of a multi-channel optical module is shifted, the intensity changes of the optical signals in each channel are varied, and thus the lens is difficult to be coupled. According to the related coupling method of the multi-channel optical module, the lens is moved back and forth in a structurally installable area until the intensity of the optical signal in each channel meets a required intensity. The process is time-consuming.

In views of this, in order to solve the above disadvantage, the inventor studied related technology and provided a reasonable and effective solution in this disclosure.

SUMMARY OF THE INVENTION

This disclosure provides a rapid batch coupling method of a multi-channel optical module.

This disclosure provides a coupling method of an optical module and having following steps: a) providing a circuit board and an output lens, wherein an optical transmitter is arranged on the circuit board, the optical transmitter includes a light emitting element, and the light emitting element emits an output light; b) covering the light emitting element by the output lens and connecting the output lens to an output meter; c1) moving the output lens and the circuit board relatively to make the output lens relatively shift along the circuit board and measuring an intensity of the output light in the output lens by the output meter, defining a region, where the output lens is located when the intensity of the output light is greater than an output requirement, as an output qualified region, and performing the steps a), b) and c1) for a predetermined number of times sequentially and repeatedly; c2) moving the output lens and the circuit board relatively to make the output lens relatively shift along the circuit board in an intersection area of the output qualified regions and measuring the intensity of the output light in the output lens by the output meter, fixing the output lens on the circuit board when the intensity of the output light is greater than the output requirement, and performing the steps a), b) and c2) repeatedly.

According to the coupling method of the optical module of this disclosure, the optical transmitter has a plurality of light emitting elements, each of the light emitting elements emits the output light. The output lens and the circuit board are moved relatively to make the output lens shift along the circuit board, the intensity of each of the output lights in the output lens is measured by the output meter, an output qualified region is defined, and the intensity of each output light is greater than the output requirement when the output lens is located in the output qualified region. The output lens and the circuit board are moved relatively to make the output lens relatively shift along the circuit board in an intersection area of the output qualified regions, the intensity of the output light in the output lens are measured by the output meter, and the output lens is fixed on the circuit board when the intensity of the output light is greater than the output requirement.

According to the coupling method of the optical module of this disclosure, an input lens is provided, an optical receiver is arranged on the circuit board, and the optical receiver includes a plurality of photoelectric transducer elements. The photoelectric transducer elements are covered by the input lens and the circuit board is connected to an input meter. A plurality of input lights is projected to each of the photoelectric transducer elements correspondingly through the input lens, the input lens is shifted along the circuit board, the intensity of each input light in the input lens are measured by the input meter, an input qualified region is defined, and the intensity of each input light is greater than an input requirement when each input lens is located in the input qualified region. The input lens is shifted along the circuit board in an intersection area of the input qualified regions, the intensity of each input light in each photoelectric transducer element is measured by the input meter, and the input lens is fixed on the circuit board when each input light is greater than the input requirement.

According to the coupling method of the optical module of this disclosure, an input lens is further provided, an optical receiver is arranged on the circuit board, the optical receiver has a plurality of photoelectric transducer elements. The input lens and the circuit board are moved relatively to make the input lens relatively shift along the circuit board, the intensity of each input light in each photoelectric transducer element is measured by the input meter, and the input lens is fixed on the circuit board when each input light is greater than the input requirement.

According to the coupling method of the optical module of this disclosure, the predetermined number of times is equal to or greater than 5 times.

According to the coupling method of the optical module of this disclosure, the circuit board is clamped to be fixed by a board clamp. According to the coupling method of this disclosure, the output lens is clamped and moved by a lens clamp.

According to the coupling method of the optical module of this disclosure, a second installing region corresponding to the optical transmitter is defined on the circuit board, and the output lens is shifted in the second installing region. A first installing region corresponding to the optical receiver is defined on the circuit board, and the input lens is shifted in the first installing region. The light emitting elements are arranged in linear and perpendicular to projecting directions of each output light in the output lens.

According to the coupling method of the optical module recited in this disclosure, a preliminary coupling process is performed before a batch coupling process to obtain a narrowed qualified region. Therefore, the areas with low coupling rate are excluded to decrease the shifting range in the batch coupling process, and the batch coupling process may be accelerated.

BRIEF DESCRIPTION OF DRAWINGS

This disclosure can be more fully understood by reading the following detailed description of the embodiment, with reference made to the accompanying drawings.

DETAILED DESCRIPTION

Figure 1:
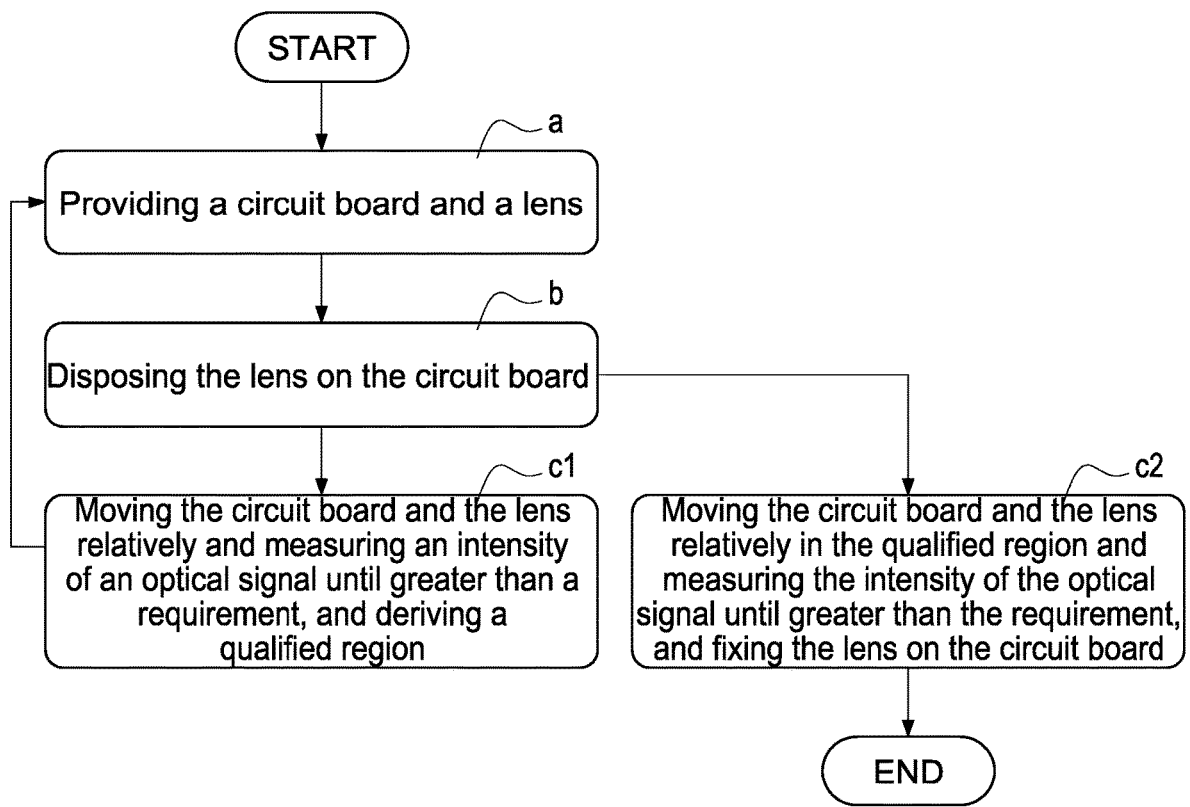
FIG. 1 is a flow chart illustrating a coupling method of an optical module according to this disclosure.

A coupling method of an optical module is provided in this disclosure. According to FIGS. 3 and 4, the optical module (for example, the optical transceiver) has a circuit board 100, an input lens 210 and an output lens 220. A circuit on the circuit board 100 has a receiver optical sub-assembly (ROSA) and a transmitter optical sub-assembly (TOSA). An optical receiver 110 is disposed in the ROSA, and an optical transmitter 120 is disposed in the TOSA. The input lens 210 is disposed corresponding to the optical receiver 110, and the input lens 210 is connected to an optical signal source to pass (or redirect) a plurality of optical signals to the optical receiver 110. The input optical signals received by the ROSA are converted into electric signals and amplified via the circuit on the circuit board 100, and the electric signals are further transmitted as the optical signals through the TOSA. The output lens 220 is disposed corresponding to the optical transmitter 120 for transmitting the optical signals. The coupling method of the optical module according to this disclosure is used for aligning the lens to make each optical signal propagating through the lenses meet an intensity requirement when an input lens 210 or an output lens 220 is installed onto the circuit board 100.

The coupling method of the optical module according to this disclosure has following steps.

Figure 2:
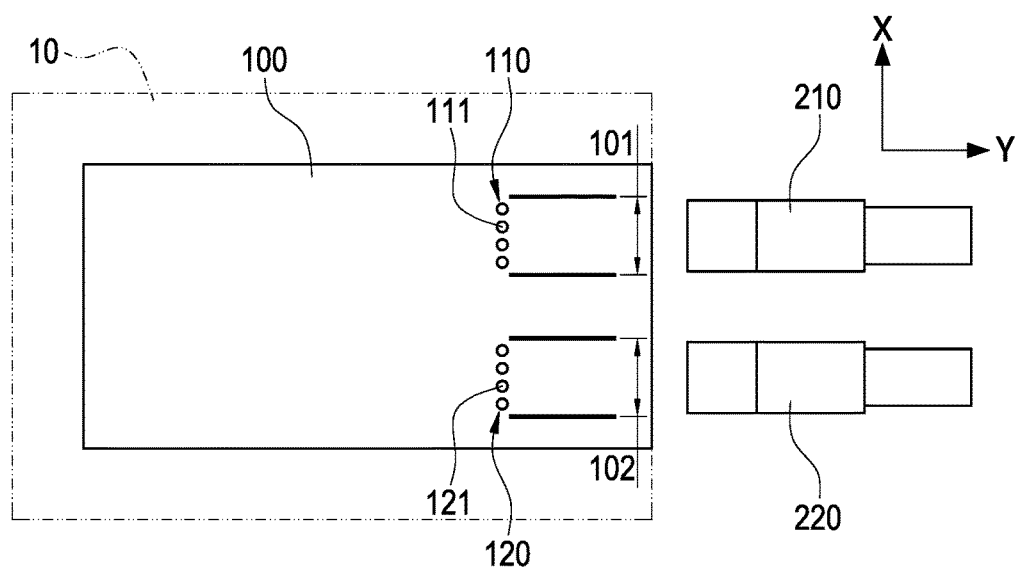
FIGS. 2 and 3 are schematic views showing the coupling method of the optical module according to this disclosure.

According to FIGS. 1 and 2, a circuit board 100 and an output lens 220 are firstly provided in the step a, an optical transmitter 120 is arranged on the circuit board 100, the optical transmitter 120 has at least one light emitting element 121, and the light emitting element 121 may emit an output light 420. According to this embodiment, each light emitting element 121 is preferably a light-emitting diode (LED) or a laser diode (LD). Moreover, according to this embodiment, the optical transmitter 120 may have a plurality of similar light emitting elements 121, each light emitting element 121 may emit the output light 420, and the light emitting elements 121 are disposed in linear.

Figure 3:
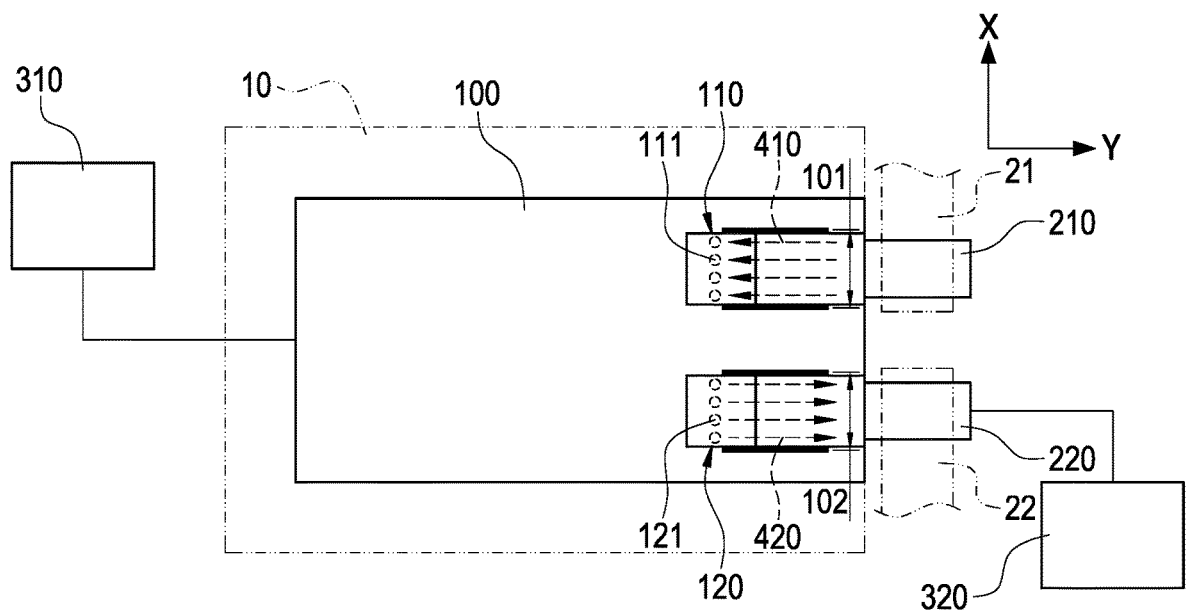
Figure 4:
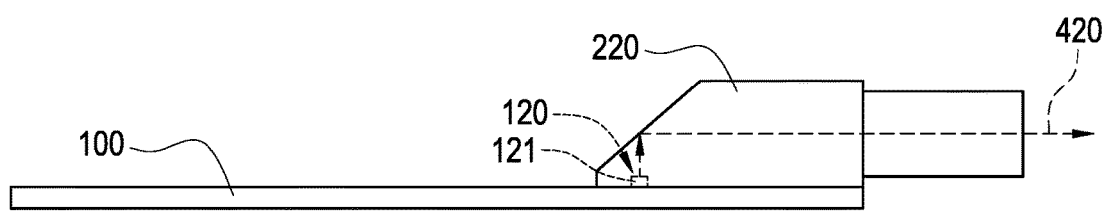
FIG. 4 is a side view showing the optical module.

According to FIGS. 1 and 3, following the step a, in the step b, the circuit board 100 is fixed. Then, the light emitting elements 121 are covered by the output lens 220 and the output lens 220 is connected to an output meter 320. The circuit board 100 is clamped and fixed by a board clamp 10. The output meter 320 is preferably an optical power meter.

Figure 5:
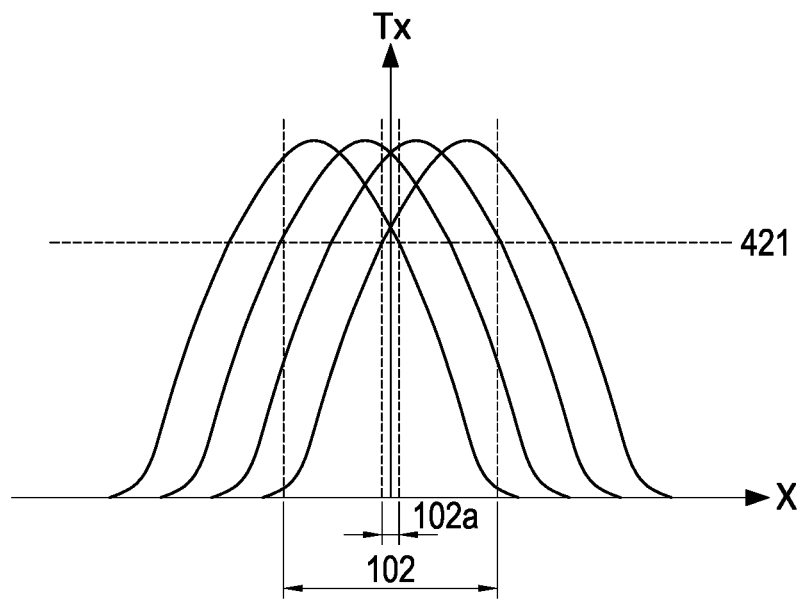
FIG. 5 is a diagram showing intensities of output lights relative to position of the output lens.

According to FIGS. 1, 3 and 5, following the step b, in the step c1, the output lens 200 and the circuit board 100 are moved relatively to make the output lens 200 shift along the circuit board 100, and an intensity of each output light 420 in the output lens 220 is measured by the output meter 320. The coupling steps are accomplished when the output lights 420 are more intense than an output requirement 421, and a region in which the output lens 220 may be coupled is defined as an output qualified region 102a. Specifically, the output lens 220 is clamped by a lens clamp 22 and the output lens 220 is moved by the lens clamp 22. The arranging direction of the light emitting elements 121 is perpendicular to the projecting directions of the output lights 420 in the output lens 220. A second installing region 102 corresponding to the optical transmitter 120 is defined on the circuit board 100, and the borders of the second installing region 102 are marked on the circuit board 100. The output lens 220 is preferably shifted along a longitudinal direction and a lateral direction of the projecting directions of the output light 420 in the second installing region 102, and thereby the coupling steps are performed in the longitudinal direction and the lateral direction. The light emitting elements 121 are located on the same position along a projecting direction of the output lights 420. Accordingly, the intensity differences between the output lights 420 on the longitudinal direction of the output light 410 are small, and the coupling steps applied on the longitudinal direction may be omitted or simplified. The coupling method applied on the lateral direction is described as an example of the coupling method of this disclosure.

The steps a, b and c1 are performed sequentially and repeatedly for a predetermined number of times to accomplish a preliminary coupling process. According to this embodiment, the predetermined number of times is equal to or greater than 5 times for the preliminary coupling. Considering a balance between accuracy of output qualified region 102a and efficiency of processing, the predetermined number of times is preferably equal to or less than 300 times, for example, 200 times. The output lens 220 coupled in the preliminary coupling process may be fixed onto the circuit board 100. Specifically, a UV resin is filled between the output lens 220 and the circuit board 100, so that the output lens 220 is pre-assembled on the circuit board 100. The UV resin is exposed to the ultraviolet rays to be cured and the coupled output lens 220 is thus fixed on the circuit board 100.

A batch coupling process with the steps a, b and c2 performed repeatedly is executed after the preliminary coupling process. In the step c2, the output lens 220 and the circuit board 100 are moved relatively in an intersection area of the output qualified regions 102a derived from the preliminary coupling process, so that the output lens 220 is shifted along the circuit board 100. The intensity of each output light 420 in the output lens 220 are measured by the output meter 320, and the output lens 220 is fixed onto the circuit board 100 when the intensity of the output lights 420 are greater than the output requirement 421. In the same way, the UV resin is filled between the output lens 220 and the circuit board 100 to pre-assemble the output lens 220 onto the circuit board 100. The UV resin is exposed to the ultraviolet rays to be cured and the coupled output lens 220 is thus fixed on the circuit board 100.

The same coupling steps may be applied to the ROSA of the optical module as well. The intensity differences relative to the positions of the input lights 410 are small (referring to FIG. 6), the coupling steps applied to the ROSA may be omitted, simplified or repeated with less predetermined number of times. According to this embodiment, in the same way, the coupling method may be applied to the ROSA, and the coupling method may be processed in the ROSA and the TOSA at the same time. Accordingly, the preliminary coupling process and the batch coupling process of the ROSA in the aforementioned steps are further described below.

According to FIGS. 1 and 2, an input lens 210 is further provided in the step a, an optical receiver 110 is arranged on the circuit board 100, and the optical receiver 110 has a plurality of photoelectric transducer elements 111, Each of the photoelectric transducer elements 111 is preferably a photodiode (PD) chip.

According to FIGS. 1 and 3, in the step b, the photoelectric transducer elements 111 are covered by the input lens 210, and the circuit board 100 is connected to an input meter 310.

Figure 6:
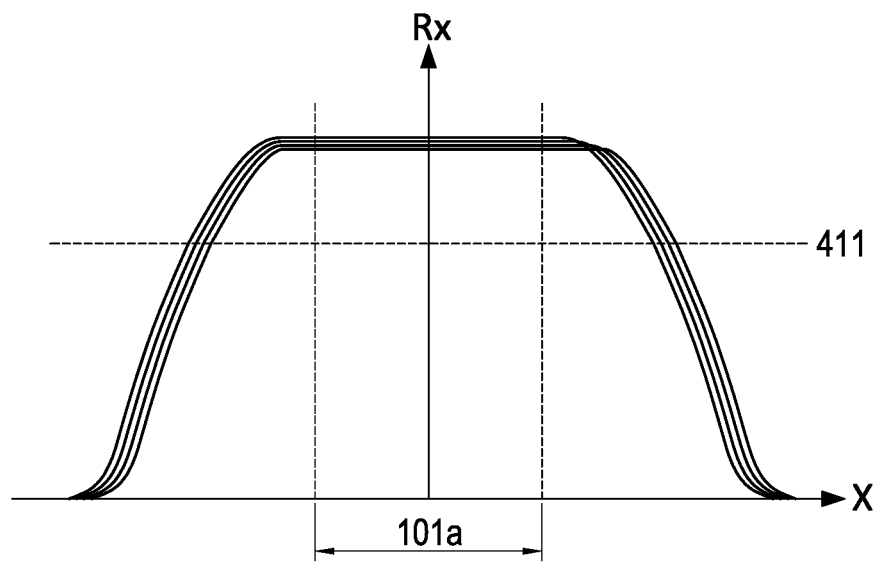
FIG. 6 is a diagram showing intensities of input lights relative to position of the input lens.

According to FIGS. 1, 3 and 6, in the step c1, a plurality of input lights 410 are projected to each of the corresponding photoelectric transducer elements 111 through the input lens 210. The input lens 210 and the circuit board 100 are moved relatively, so that the input lens 210 is shifted along the circuit board 100. The intensity of each input light 410 in the input lens 210 is measured by the input meter 310, and an input qualified region 101a in which the intensity of the input light 410 is greater than an input requirement 411 is defined. Specifically, the input lens 210 is clamped by a lens clamp 21 and the input lens 210 is moved by the lens clamp 21. The input meter 310 may be a computer. The input meter 310 may read each electric signal, that is converted from the input light 410, through the circuit board 100 by a pre-installed software, and the intensity of each input light 410 may be thus derived.

According to this embodiment, the coupling steps may be applied to the ROSA and the TOSA at the same time. In other words, the output lens 220 and the input lens 210 are respectively clamped by a pair of lens clamps 22/21, and the output lens 220 and the input lens 210 are respectively moved by the pair of lens clamp 22/21 at the same time. The photoelectric transducer elements 111 are arranged in linear and perpendicular to the projecting directions of the input lights 410, a first installing region 101 corresponding to the optical receiver 110 is defined on the circuit board 100, and the borders of the first installing region 101 are marked on the circuit board 100. Preferably, the input lens 210 is respectively shifted along a lateral direction and a longitudinal direction of the input lights 410 in the first installing region 101, and the coupling steps are thus performed in the longitudinal direction and the lateral direction. The board clamp 10 may be movable and the lens clamp 22/21 may be fixed, or both of the board clamp 10 and the lens clamp 22/21 may be movable. These are, of course, merely examples and are not intended to be limiting.

The input lens 210 coupled in the preliminary coupling process may be fixed on the circuit board 100. Specifically, the UV resin is filled between the input lens 210 and the circuit board 100, so that the input lens 210 is pre-assembled on the circuit board 100. The UV resin is exposed to the ultraviolet rays to be cured and the coupled input lens 210 is thus fixed on the circuit board 100.

In the step c2, the input lens 210 and the circuit board 100 are moved relatively in an intersection area of the input qualified regions 101a derived from the preliminary coupling process, so that the input lens 210 is shifted along the circuit board 100 and the intensities of the input lights 410 in each photoelectric transducer element 111 are measured by the input meter 310, and the input lens 210 is fixed on the circuit board 100 when the intensity of the input light 410 is greater than the input requirement 411. In the same way, the UV resin is filled between the input lens 210 and the circuit board 100 to pre-assemble the input lens 210 onto the circuit board 100. The UV resin is exposed to the ultraviolet rays to be cured and the coupled input lens 210 is thus fixed on the circuit board 100.

According to the coupling method of the optical module recited in this disclosure, a preliminary coupling process is performed before a batch coupling process to derived a narrowed qualified region. Therefore, the areas of low coupling rate are excluded to decrease the shifting range in the batch coupling process, and the batch coupling process may be accelerated.

Although this disclosure has been described with reference to the foregoing embodiment, it will be understood that the disclosure is not limited to the details thereof. Various equivalent variations and modifications can still occur to those skilled in this art in view of the teachings of this disclosure. Thus, all such variations and equivalent modifications are also embraced within the scope of this disclosure as defined in the appended claims.

What is claimed is:

1. A coupling method of an optical module, the coupling method comprising:
    a) providing a circuit board and an output lens, wherein a plurality of optical transmitter are arranged on the circuit board, each optical transmitter comprises a light emitting element, and each light emitting element emits an output light;
    b) covering the light emitting element by the output lens;
    c1) moving the output lens and the circuit board relatively to make the output lens relatively shift along the circuit board and measuring an intensity of each output light in the output lens, defining a region, where the output lens is located when the intensity of the output light is greater than an output requirement, as an output qualified region; and
    c2) moving the output lens and the circuit board relatively to make the output lens relatively shifted along the circuit board in an intersection area of the output qualified regions and measuring each intensity, and fixing the output lens on the circuit board when intensities of output lights are greater than the output requirement,
    wherein the steps a, b and c1 are performed sequentially and repeatedly for a predetermined number of times to accomplish a preliminary coupling process, and a batch coupling process comprising the steps a, b and c2 sequentially repeated multiple times is executed after the preliminary coupling process,
    wherein the intensities are measured by an output meter;
    wherein the predetermined number of times is equal to or greater than 5 times, and the predetermined number of times is equal to or less than 300 times.

2. The coupling method of the optical module according to claim 1, wherein the step a) further comprises providing an input lens, wherein an optical receiver is arranged on the circuit board, and the optical receiver comprises a plurality of photoelectric transducer elements;

the step b) further comprises covering the photoelectric transducer elements by the input lens and connecting the circuit board to an input meter;
the step c1) further comprises projecting a plurality of input lights to each of the photoelectric transducer elements correspondingly through the input lens, shifting the input lens along the circuit board and measuring an intensity of each input light in the input lens by the input meter, defining a region, where the input lens is located when the intensity of each input light is greater than an input requirement, as an input qualified region; and the step c2) further comprises shifting the input lens along the circuit board in an intersection area of the input qualified regions and measuring the intensity of each input light in each photoelectric transducer element by the input meter, and fixing the input lens on the circuit board when the intensity of each input light is greater than the input requirement.

3. The coupling method of the optical module according to claim 2, wherein the step b) further comprises clamping to fix the circuit board by a board clamp.

4. The coupling method of the optical module according to claim 2, further comprising: defining a first installing region on the circuit board corresponding to the optical receiver, and shifting the input lens in the first installing region.

5. The coupling method of the optical module according to claim 1, wherein the step a) further comprises providing an input lens, wherein an optical receiver is arranged on the circuit board, the optical receiver comprises a plurality of photoelectric transducer elements;
the step b) further comprises covering the photoelectric transducer elements by the input lens and connecting the circuit board to an input meter;
the step c2) further comprises moving the input lens and the circuit board relatively to make the input lens relatively shift along the circuit board and measuring an intensity of each input light in each photoelectric transducer elements by the input meter, and fixing the input lens on the circuit board when each input light is greater than the input requirement.

6. The coupling method of the optical module according to claim 5, wherein the step b) further comprises clamping to fix the circuit board by a board clamp.

7. The coupling method of the optical module according to claim 5, further comprising: defining a first installing region on the circuit board corresponding to the optical receiver, and shifting the input lens in the first installing region.

8. The coupling method of the optical module according to claim 1, wherein the step b) further comprises clamping to fix the circuit board by a board clamp.

9. The coupling method of the optical module according to claim 1, further comprising: clamping and moving the output lens by a lens clamp.

10. The coupling method of the optical module according to claim 1, wherein the step c1) further comprises defining a second installing region on the circuit board corresponding to the optical transmitter, and shifting the output lens in the second installing region.

11. The coupling method of the optical module according to claim 1, wherein the light emitting elements are arranged in linear and perpendicular to projecting directions of the output lights in the output lens.

* * * * *